(12) United States Patent
Sullivan

(10) Patent No.: US 7,360,693 B1
(45) Date of Patent: Apr. 22, 2008

(54) SYSTEM AND METHOD FOR A CARD BENEFIT PROGRAM PROVIDING BENEFITS TO PROGRAM MEMBERS BASED ON PROGRAM PERFORMANCE

(75) Inventor: Kevin Sullivan, Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 11/458,881

(22) Filed: Jul. 20, 2006

Related U.S. Application Data

(63) Continuation of application No. 10/853,107, filed on May 26, 2004, now Pat. No. 7,086,586.

(60) Provisional application No. 60/494,559, filed on Aug. 13, 2003.

(51) Int. Cl.
*G06K 5/00* (2006.01)
(52) U.S. Cl. .................... 235/380; 235/381; 235/382; 235/383; 705/10; 705/14; 705/35; 705/39
(58) Field of Classification Search ........ 235/380–383; 705/10–14, 35–39
See application file for complete search history.

(56) References Cited

U.S. PATENT DOCUMENTS

| | | |
|---|---|---|
| 3,634,669 A | 1/1971 | Wyckoff et al. |
| 3,946,206 A | 3/1976 | Darjany |
| 4,047,033 A | 9/1977 | Malmberg et al. |
| 4,465,206 A | 8/1984 | Sorel et al. |
| 4,545,838 A | 10/1985 | Minkus et al. |
| 4,582,985 A | 4/1986 | Lofberg |
| 4,614,861 A | 9/1986 | Pavlov et al. |

(Continued)

FOREIGN PATENT DOCUMENTS

CA 2293321 6/1998

(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

(Continued)

*Primary Examiner*—Michael G. Lee
*Assistant Examiner*—Allyson N Trail
(74) *Attorney, Agent, or Firm*—Goodwin Procter LLP

(57) ABSTRACT

The present invention comprises an apparatus and method for a card payment instrument providing that a share of program profits above a pre-designated level is returned to participating recipients at pre-designated intervals such as annually. Participants respond to an offer to participate in the mutual benefit program. After admission to the program, the card issuer tracks the performance according to the desired performance metric for the participants. At certain intervals, such as yearly, the card issuer reports out the financial performance for the period. If the performance exceeded the pre-designated threshold performance, then returns are distributed to participants according to a share methodology. The share methodology can provide that returns are allocated among participants according to various criteria, such as based on non-financial criteria including: periods of inactivity and financial criteria including: spending volume, finance charges, and so forth.

26 Claims, 6 Drawing Sheets

U.S. PATENT DOCUMENTS

| | | |
|---|---|---|
| 4,634,845 A | 1/1987 | Riley |
| 4,689,478 A | 8/1987 | Hale et al. |
| 4,700,055 A | 10/1987 | Kashkashian, Jr. |
| 4,746,787 A | 5/1988 | Okada |
| 4,750,119 A | 6/1988 | Robertson |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton et al. |
| 5,049,728 A | 9/1991 | Rovin |
| 5,055,662 A | 10/1991 | Hasegawa |
| 5,080,748 A | 1/1992 | Bonomi |
| 5,095,194 A | 3/1992 | Barbanell |
| 5,117,355 A | 5/1992 | McCarthy |
| 5,146,068 A | 9/1992 | Ugawa et al. |
| 5,175,416 A | 12/1992 | Mansvelt et al. |
| 5,180,901 A | 1/1993 | Hiramatsu |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,359,183 A | 10/1994 | Skodlar |
| 5,365,575 A | 11/1994 | Katz |
| 5,383,113 A | 1/1995 | Knight |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert et al. |
| 5,450,477 A | 9/1995 | Amarant et al. |
| 5,453,601 A | 9/1995 | Rosen |
| 5,455,407 A | 10/1995 | Rosen |
| 5,459,306 A | 10/1995 | Stein et al. |
| 5,465,206 A | 11/1995 | Hilt et al. |
| 5,466,919 A | 11/1995 | Henry |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Malark |
| 5,483,445 A | 1/1996 | Pickering |
| 5,500,514 A | 3/1996 | Veeneman et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,537,314 A | 7/1996 | Kanter |
| 5,544,086 A | 8/1996 | Davis et al. |
| 5,544,246 A | 8/1996 | Mandelbaum et al. |
| 5,553,120 A | 9/1996 | Katz |
| 5,577,109 A | 11/1996 | Stimson et al. |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,621,787 A | 4/1997 | McKoy et al. |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,653,914 A | 8/1997 | Holmes et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,955 A | 10/1997 | Doggett et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,734,154 A | 3/1998 | Jachimowicz et al. |
| 5,734,838 A | 3/1998 | Robinson |
| 5,736,728 A | 4/1998 | Matsubara |

| | | | | | | |
|---|---|---|---|---|---|---|
| 5,737,421 A | 4/1998 | Audebert | | 5,933,817 A | 8/1999 | Hucal |
| 5,740,549 A | 4/1998 | Reilly et al. | | 5,937,068 A | 8/1999 | Audebert |
| 5,742,775 A | 4/1998 | King | | 5,940,811 A | 8/1999 | Norris |
| 5,745,049 A | 4/1998 | Akiyama et al. | | 5,952,641 A | 9/1999 | Korshun |
| 5,745,706 A | 4/1998 | Wolfberg et al. | | 5,953,423 A | 9/1999 | Rosen |
| 5,749,075 A | 5/1998 | Toader et al. | | 5,953,710 A | 9/1999 | Fleming |
| 5,760,381 A | 6/1998 | Stich et al. | | 5,955,961 A | 9/1999 | Wallerstein |
| 5,765,138 A | 6/1998 | Aycock et al. | | 5,963,648 A | 10/1999 | Rosen |
| 5,765,141 A | 6/1998 | Spector | | 5,970,479 A | 10/1999 | Shepherd |
| 5,770,843 A | 6/1998 | Rose et al. | | 5,970,480 A | 10/1999 | Kalina |
| 5,770,849 A | 6/1998 | Novis et al. | | 5,974,399 A | 10/1999 | Giuliani et al. |
| 5,774,870 A | 6/1998 | Storey | | RE36,365 E | 11/1999 | Levine et al. |
| 5,777,305 A | 7/1998 | Smith et al. | | 5,984,180 A | 11/1999 | Albrecht |
| 5,777,306 A | 7/1998 | Masuda | | 5,984,191 A | 11/1999 | Chapin, Jr. |
| 5,777,903 A | 7/1998 | Piosenka et al. | | 5,987,434 A | 11/1999 | Libman |
| 5,778,067 A | 7/1998 | Jones et al. | | 5,988,509 A | 11/1999 | Taskett |
| 5,787,156 A | 7/1998 | Katz | | 5,991,413 A | 11/1999 | Arditti et al. |
| 5,787,404 A | 7/1998 | Fernandez-Holmann | | 5,991,743 A | 11/1999 | Irving et al. |
| 5,789,733 A | 8/1998 | Jachimowicz et al. | | 5,991,748 A | 11/1999 | Taskett |
| 5,794,207 A | 8/1998 | Walker | | 5,991,750 A | 11/1999 | Craig |
| 5,799,087 A | 8/1998 | Rosen | | 6,000,608 A | 12/1999 | Dorf |
| 5,802,176 A | 9/1998 | Audebert | | 6,000,832 A | 12/1999 | Franklin et al. |
| 5,805,719 A | 9/1998 | Pare et al. | | 6,002,383 A | 12/1999 | Shimada |
| 5,806,042 A | 9/1998 | Kelly et al. | | 6,003,762 A | 12/1999 | Hayashida |
| 5,806,044 A | 9/1998 | Powell | | 6,004,681 A | 12/1999 | Epstein et al. |
| 5,806,045 A | 9/1998 | Biorge | | 6,006,988 A | 12/1999 | Behrmann et al. |
| 5,807,627 A | 9/1998 | Friend et al. | | 6,009,415 A | 12/1999 | Shurling et al. |
| 5,809,478 A | 9/1998 | Greco | | 6,014,636 A | 1/2000 | Reeder |
| 5,815,657 A | 9/1998 | Williams et al. | | 6,014,638 A | 1/2000 | Burge et al. |
| 5,815,658 A | 9/1998 | Kuriyama | | 6,014,645 A | 1/2000 | Cunningham |
| 5,819,234 A | 10/1998 | Slavin et al. | | 6,014,749 A | 1/2000 | Gloor et al. |
| 5,819,237 A | 10/1998 | Garman | | 6,016,482 A | 1/2000 | Molinari et al. |
| 5,832,457 A | 11/1998 | O'Brien | | 6,016,954 A | 1/2000 | Abe et al. |
| 5,832,488 A | 11/1998 | Eberhardt | | 6,019,284 A | 2/2000 | Freeman et al. |
| 5,835,061 A | 11/1998 | Stewart | | 6,026,370 A | 2/2000 | Jermyn |
| 5,835,576 A | 11/1998 | Katz | | 6,029,139 A | 2/2000 | Cunningham et al. |
| 5,839,113 A | 11/1998 | Federau et al. | | 6,029,890 A | 2/2000 | Austin |
| 5,845,259 A | 12/1998 | West et al. | | 6,032,136 A | 2/2000 | Brake, Jr. et al. |
| 5,845,260 A | 12/1998 | Nakano et al. | | 6,036,099 A | 3/2000 | Leighton |
| 5,852,811 A | 12/1998 | Atkins | | 6,038,292 A | 3/2000 | Thomas |
| 5,852,812 A | 12/1998 | Reeder | | 6,038,552 A | 3/2000 | Fleischl et al. |
| 5,857,079 A | 1/1999 | Claus et al. | | 6,041,315 A | 3/2000 | Pollin |
| 5,857,175 A | 1/1999 | Day | | 6,045,042 A | 4/2000 | Ohno |
| 5,857,709 A | 1/1999 | Chock | | 6,047,067 A | 4/2000 | Rosen |
| 5,859,419 A | 1/1999 | Wynn | | 6,047,268 A | 4/2000 | Bartoli et al. |
| 5,864,609 A | 1/1999 | Cross et al. | | 6,049,463 A | 4/2000 | O'Malley et al. |
| 5,864,828 A | 1/1999 | Atkins | | 6,049,773 A | 4/2000 | McCormack et al. |
| 5,864,830 A | 1/1999 | Armetta et al. | | 6,049,782 A | 4/2000 | Gottesman et al. |
| RE36,116 E | 2/1999 | McCarthy | | 6,058,378 A | 5/2000 | Clark et al. |
| 5,870,718 A | 2/1999 | Spector | | 6,064,985 A | 5/2000 | Anderson |
| 5,870,721 A | 2/1999 | Norris | | 6,065,675 A | 5/2000 | Teicher |
| 5,875,437 A | 2/1999 | Atkins | | 6,068,183 A | 5/2000 | Freeman et al. |
| 5,883,377 A | 3/1999 | Chapin, Jr. | | 6,070,067 A | 5/2000 | Nguyen et al. |
| 5,883,810 A | 3/1999 | Franklin et al. | | 6,070,147 A | 5/2000 | Harms et al. |
| 5,884,271 A | 3/1999 | Pitroda | | 6,070,153 A | 5/2000 | Simpson |
| 5,884,278 A | 3/1999 | Powell | | 6,076,068 A | 6/2000 | DeLapa et al. |
| 5,884,285 A | 3/1999 | Atkins | | 6,076,072 A | 6/2000 | Libman |
| 5,887,065 A | 3/1999 | Audebert | | 6,078,888 A | 6/2000 | Johnson, Jr. |
| 5,890,138 A | 3/1999 | Godin et al. | | 6,078,891 A | 6/2000 | Riordan et al. |
| 5,890,140 A | 3/1999 | Clark et al. | | 6,091,817 A | 7/2000 | Bertina et al. |
| H1794 H | 4/1999 | Claus | | 6,092,056 A | 7/2000 | Tull, Jr. et al. |
| 5,897,620 A | 4/1999 | Walker et al. | | 6,095,412 A | 8/2000 | Bertina et al. |
| 5,905,246 A | 5/1999 | Fajkowski | | 6,095,416 A | 8/2000 | Grant et al. |
| 5,911,135 A | 6/1999 | Atkins | | 6,098,053 A | 8/2000 | Slater |
| 5,911,136 A | 6/1999 | Atkins | | 6,105,011 A | 8/2000 | Morrison, Jr. |
| 5,914,472 A | 6/1999 | Foladare et al. | | 6,105,865 A | 8/2000 | Hardesty |
| 5,920,629 A | 7/1999 | Rosen | | 6,115,458 A | 9/2000 | Taskett |
| 5,920,844 A | 7/1999 | Hotta et al. | | 6,119,932 A | 9/2000 | Maloney et al. |
| 5,920,847 A | 7/1999 | Kolling et al. | | 6,122,623 A | 9/2000 | Garman |
| 5,923,734 A | 7/1999 | Taskett | | 6,128,598 A | 10/2000 | Walker et al. |
| 5,926,800 A | 7/1999 | Baronowski et al. | | 6,128,599 A | 10/2000 | Walker et al. |
| 5,930,217 A | 7/1999 | Kayanuma | | 6,129,274 A | 10/2000 | Suzuki |
| 5,931,764 A | 8/1999 | Freeman et al. | | 6,134,536 A | 10/2000 | Shepherd |

| | | | | | | |
|---|---|---|---|---|---|---|
| 6,138,917 | A | 10/2000 | Chapin, Jr. | 6,868,426 B1 | 3/2005 | Mankoff |
| 6,145,741 | A | 11/2000 | Wisdom et al. | 6,876,971 B1 | 4/2005 | Burke |
| 6,148,297 | A | 11/2000 | Swor et al. | 6,901,372 B1 | 5/2005 | Helzerman |
| 6,161,096 | A | 12/2000 | Bell | 7,006,992 B1 | 2/2006 | Packwood |
| 6,163,770 | A | 12/2000 | Gamble et al. | 2001/0011243 A1 | 8/2001 | Dembo et al. |
| 6,164,533 | A | 12/2000 | Barton | 2001/0027441 A1 | 10/2001 | Wankmueller |
| 6,167,385 | A | 12/2000 | Hartley-Urquhart | 2001/0034682 A1 | 10/2001 | Knight et al. |
| 6,169,975 | B1 | 1/2001 | White et al. | 2001/0037315 A1 | 11/2001 | Saliba et al. |
| 6,173,267 | B1 | 1/2001 | Cairns | 2001/0044293 A1 | 11/2001 | Morgan |
| 6,182,048 | B1 | 1/2001 | Osborn et al. | 2001/0047342 A1 | 11/2001 | Cuervo |
| 6,182,894 | B1 | 2/2001 | Hackett et al. | 2001/0054003 A1 | 12/2001 | Chien et al. |
| 6,186,793 | B1 | 2/2001 | Brubaker | 2001/0056398 A1 | 12/2001 | Scheirer |
| 6,189,787 | B1 | 2/2001 | Dorf | 2002/0019803 A1 | 2/2002 | Muller |
| 6,195,644 | B1 | 2/2001 | Bowie | 2002/0026418 A1 | 2/2002 | Koppel et al. |
| 6,202,053 | B1 | 3/2001 | Christiansen et al. | 2002/0046255 A1 | 4/2002 | Moore et al. |
| RE37,122 | E | 4/2001 | Levine et al. | 2002/0062235 A1 | 5/2002 | Wahlbin et al. |
| 6,227,447 | B1 | 5/2001 | Campisano | 2002/0077978 A1 | 6/2002 | O'Leary et al. |
| 6,243,688 | B1 | 6/2001 | Kalina | 2002/0091572 A1 | 7/2002 | Anderson et al. |
| 6,263,316 | B1 | 7/2001 | Khan et al. | 2002/0091631 A1 | 7/2002 | Usui |
| 6,265,977 | B1 | 7/2001 | Vega et al. | 2002/0095365 A1 | 7/2002 | Slavin et al. |
| 6,278,981 | B1 | 8/2001 | Dembo et al. | 2002/0104878 A1 | 8/2002 | Seifert et al. |
| 6,295,522 | B1 | 9/2001 | Boesch | 2002/0116271 A1 | 8/2002 | Mankoff |
| 6,298,336 | B1 | 10/2001 | Davis et al. | 2002/0116330 A1 | 8/2002 | Hed et al. |
| 6,308,268 | B1 | 10/2001 | Audebert | 2002/0120627 A1 | 8/2002 | Mankoff |
| 6,336,099 | B1 | 1/2002 | Barnett et al. | 2002/0120642 A1 | 8/2002 | Fetherston |
| 6,341,724 | B2 | 1/2002 | Campisano | 2002/0143703 A1 | 10/2002 | Razvan et al. |
| 6,343,743 | B1 | 2/2002 | Lamla | 2002/0147662 A1 | 10/2002 | Anderson |
| 6,345,261 | B1 | 2/2002 | Feidelson et al. | 2002/0165820 A1 | 11/2002 | Anvekar et al. |
| 6,345,766 | B1 | 2/2002 | Taskett et al. | 2002/0174016 A1 | 11/2002 | Cuervo |
| 6,349,291 | B1 | 2/2002 | Varma | 2003/0004828 A1 | 1/2003 | Epstein |
| 6,360,954 | B1 | 3/2002 | Barnardo | 2003/0023549 A1 | 1/2003 | Armes et al. |
| 6,366,220 | B1 | 4/2002 | Elliott | 2003/0028518 A1 | 2/2003 | Mankoff |
| 6,373,969 | B1 | 4/2002 | Adler | 2003/0033211 A1 | 2/2003 | Haines et al. |
| 6,377,669 | B1 | 4/2002 | Walker et al. | 2003/0033246 A1 | 2/2003 | Slater |
| 6,385,591 | B1 | 5/2002 | Mankoff | 2003/0046249 A1 | 3/2003 | Wu |
| 6,386,444 | B1 | 5/2002 | Sullivan | 2003/0053609 A1 | 3/2003 | Risafi et al. |
| 6,397,202 | B1 | 5/2002 | Higgins et al. | 2003/0101119 A1 | 5/2003 | Persons et al. |
| 6,402,039 | B1 | 6/2002 | Freeman et al. | 2003/0105672 A1 | 6/2003 | Epstein et al. |
| 6,405,182 | B1 | 6/2002 | Cuervo | 2003/0135462 A1 | 7/2003 | Brake, Jr. et al. |
| 6,422,459 | B1 | 7/2002 | Kawan | 2003/0140004 A1 | 7/2003 | O'Leary et al. |
| 6,422,462 | B1 | 7/2002 | Cohen | 2003/0144935 A1 | 7/2003 | Sobek |
| 6,424,029 | B1 | 7/2002 | Giesler | 2003/0154125 A1 | 8/2003 | Mittal et al. |
| 6,429,927 | B1 | 8/2002 | Borza | 2003/0163403 A1 | 8/2003 | Chen et al. |
| 6,434,259 | B1 | 8/2002 | Hamid et al. | 2003/0163416 A1 | 8/2003 | Kitajima |
| 6,446,210 | B1 | 9/2002 | Borza | 2003/0172040 A1 | 9/2003 | Kemper et al. |
| 6,450,407 | B1 | 9/2002 | Freeman et al. | 2003/0195808 A1 | 10/2003 | Brown et al. |
| 6,463,039 | B1 | 10/2002 | Ricci et al. | 2003/0200143 A9 | 10/2003 | Walker et al. |
| 6,467,684 | B2 | 10/2002 | Fite et al. | 2003/0200180 A1 | 10/2003 | Phelan et al. |
| 6,473,500 | B1 | 10/2002 | Risafi et al. | 2003/0216965 A1 | 11/2003 | Libman |
| 6,484,144 | B2 | 11/2002 | Martin et al. | 2004/0024672 A1 | 2/2004 | Brake, Jr. et al. |
| 6,484,148 | B1 | 11/2002 | Boyd | 2004/0030626 A1 | 2/2004 | Libman |
| 6,498,861 | B1 | 12/2002 | Hamid et al. | 2004/0039588 A1 | 2/2004 | Libman |
| 6,505,168 | B1 | 1/2003 | Rothman et al. | 2004/0098351 A1 | 5/2004 | Duke |
| 6,560,578 | B2 | 5/2003 | Eldering | 2004/0243498 A1 | 12/2004 | Duke |
| 6,574,603 | B1 | 6/2003 | Dickson et al. | 2005/0021400 A1 | 1/2005 | Postrel |
| 6,581,839 | B1 | 6/2003 | Lasch et al. | 2005/0027649 A1 | 2/2005 | Cech |
| 6,601,761 | B1 | 8/2003 | Katis | 2005/0071230 A1 | 3/2005 | Mankoff |
| 6,609,111 | B1 | 8/2003 | Bell | 2005/0075932 A1 | 4/2005 | Mankoff |
| 6,687,222 | B1 | 8/2003 | Mittal et al. | 2005/0091138 A1 | 4/2005 | Awatsu |
| RE38,255 | E | 9/2003 | Levine et al. | 2005/0171898 A1 | 8/2005 | Bishop et al. |
| 6,615,189 | B1 | 9/2003 | Phillips et al. | | | |
| 6,615,190 | B1 | 9/2003 | Slater | FOREIGN PATENT DOCUMENTS | | |
| 6,625,582 | B2 | 9/2003 | Richman et al. | | | |
| 6,631,849 | B2 | 10/2003 | Blossom | EP | 959440 | 11/1999 |
| 6,641,049 | B2 | 11/2003 | Luu | GB | 2275654 A | 9/1994 |
| 6,641,050 | B2 | 11/2003 | Kelley et al. | GB | 2376787 | 12/2002 |
| 6,675,127 | B2 | 1/2004 | LaBlanc et al. | GB | 2377071 | 12/2002 |
| 6,693,544 | B1 | 2/2004 | Hebbecker | GB | 2377314 | 1/2003 |
| 6,742,704 | B2 | 6/2004 | Fitzmaurice et al. | WO | WO 94/29112 | 12/1994 |
| 6,745,938 | B2 | 6/2004 | Sullivan | WO | WO 97/41673 | 11/1997 |
| 6,802,008 | B1 | 10/2004 | Ikefuji et al. | WO | WO 98/59307 | 12/1998 |
| 6,805,287 | B2 | 10/2004 | Bishop | WO | WO 99/05633 | 2/1999 |
| 6,865,547 | B1 | 3/2005 | Brake, Jr. et al. | WO | WO 01/69347 | 9/2001 |

| | | | |
|---|---|---|---|
| WO | WO 01/69347 | A2 | 9/2001 |
| WO | WO 01/69347 | A3 | 9/2001 |
| WO | WO 2005/043277 | A3 | 5/2005 |

OTHER PUBLICATIONS

Song, A Card That Asks For ID, Time Magazine, Apr. 12, 2004, 1 page.
A Store Card Issuer Looks for Lift from Electronic Gift Certificates, Credit Card News, Feb. 1, 1995, 2 pages.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Visa first to launch electronic purse load via GSM mobile phone, www.cellular.co.za, Johannesburg, ZA, printed Feb. 23, 2001, 4 pages.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.
CardEx Incentives, www.cardex.com, Apr. 6, 1999.
CardFlash, Apr. 5, 2005.
Vandenengle, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying By Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 To Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Machlis, Have it the smart way: Burger King program drives smart-card use, Computerworld, printed Feb. 23, 2001, 1 page.
Here's the calling convenience you asked for: 1-800-call-ATT . . . For All Calls, AT&T, Appendix A: For Car Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
Visa releases visa cash electronic purse specifications based on CEPS, www.visa.com/av/news/PRaamisc042099.vhtml, San Francisco, Apr. 20, 1999.
Konrad, IBM Had a Bunch of Unusual Ideas in 2003, www.philly.com, printed Jan. 21, 2004, posted on Jan. 13, 2004, 2 pages.
O'Conner, Maritz Gets MasterCard's Stamp of Approval, Business Travel News, Aug. 19, 1996, 2 pages.
Incentive Firms Find Debit Cards A Rewarding Experience (Off-line debit card issuers converge efforts with companies looking for effective incentives to boost employee productivity and to motivate individuals to buy their products), Debit Card News, vol.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
MailFrontier Survey Finds that Consumers Hold Financial Institutions Accountable for Online Identitiy Theft, www.mailfrontier.com, Palo Alto, CA, Nov. 2004.
Welcome To Card Express CardEx, CardEx website archived by web.archive on Oct. 31, 1996, http://web.archive.org/web/*/http://www.cardex.com, retrieve Oct. 18, 2003, 7 pages.
Welcome To Card Express, The CardEx Incentive Card, as disclosed in the CardEx web site archived by web.archive.org on Feb. 7, 1998, http://web.archive.org/web/*/http://www.cardex.com, Oct. 18, 2003, 8 pages.
Swiftgift, Welcome to Swiftgift, www.swiftgiftcard.com, Dec. 8, 1998, 10 pages.
Machlis et al., Will smart cards replace ATMS?, Computerworld, printed Feb. 23, 2001, 3 pages.

Hansell, Visa to unveil electronic purse cards, New York Times, printed Feb. 23, 2001, 2 pages.

Clark, Microsoft, Visa to Jointly Develop PC Electronic-Shopping Software, The Wall Street Journal, Nov. 9, 1994, Nov. 9, 1994 WSJ B9.

More Retailers Turn to Co-Branding, Chain Store Age Executive with Shopping Center Age, Feb. 1, 1995, 3 pages.

Bogle, Mutual Funds at the Millennium: Fund Directors and Fund Myths, The Vanguard Group to the '40 Act Institute of PLI (Practicing Law Institute), New York, NY, May 15, 2000, 15 pages.

New 1-800-CALL-ATT Campaign Promotes One Number for All Calls, AT&T Marketing, News Release, www.att.com/press/0297/970217.csa.htm, Feb. 17, 1997, 2 pages.

Schwab, Charles, Now 7 Ways For A better Total Return For Your Money; Schwat 1, The Inventor's Asset Management Account, Charles R. Schwab, Charles Schwab & Co., Inc., 16 pages.

Dugas, Payroll May Ask: Paper or Plastic?, USA Today, 3B, Aug. 14, 2001, 1 page.

Proton world and Europay to co-operate in creation of new CEPS-compliant e-purse application, Press Release 1999, Waterloo, Belgium, Jun. 28, 1999, 2 pages.

Brown et al., Purchasing Card Magic: Eli Lilly Finds Accounts Payable Flying High With Plastic, Corporate Cashflow, vol. 15, No. 12, Nov. 1994, 2 pages.

Purse Application for Cross Border Use in Euro, Cordis, Pace 1st 1999-11531 Pace, www.cordis.lu, printed Feb. 23, 2001, 3 pages.

SK100 Smart Card Electronic Purse Balance Reader, SK100 Balance Reader, http://perso.wanadoo.fr, printed Feb. 23, 2001, 1 page.

Miller, Section E.2.1: Kerberos Authentication and Authorization System, Project Athena, Cambridge, MA, Dec. 21, 1987, 39 pages.

Souccar, Smart Cards: 1st Union Smart Card Pilot Enlists a Second Army Base. American Banker, Digital Frontiers, vol. 164, No. 61, Mar. 31, 1999, 3 pages.

Smart Cards: Big Brother's Little Helpers, The Privacy Committee of New South Wales, No. 66, Aug. 1995.

Smart card for loyalty and e-purse applications eclipses capability of conventional mag-stripe cards, Press Release, www.1.sib.com, Apr. 21, 1997, printed Feb. 23, 2001, 3 pages.

SmartAxis: Load Cash on to your E-Purse Card, Supported Currencies and Schemes, www.smartaxis.co.uk, printed Feb. 23, 2001, 9 pages.

Spurgin, Sopininmon! or What's Happening in the Retail Credit Card Environment, Credit World Journal, vol. 85, No. 4, Mar. 1, 1997, pp. 20-23.

Lacker, Stored Value Cards: Costly Private Substitutions for Government Currency, Economic Quarterly, 1996, Economic Quarterly, v82, n3, p. 1(25), ISSN: 1069-7225, 17 pages.

Lazarony, Stuck for a gift? Give a prepaid credit card, www.bankrate.com, Dec. 21, 1998, 1 page.

Key, Swift Gift 'Wows' Internet Shoppers, PR Newswire, www.key.com/swiftgift/home.html, Dec. 2, 1998, 1 page.

The Campus Card Conundrum, Card Technology, Journal ISSN: 1093-1279, p. 25+, Feb. 1998, pp. 1-8.

The Electronic Purse Reaches the Car Park, http:\\docs.vircom.net/mobility/parking, printed Feb. 23, 2001, 2 pages.

The Evolution of a New Consumerism, Chain Store Age, vol. 73, Jun. 1997, pp. 8-9.

Stoughton, The Gift of Credit, www.washingtonpost.com/wp-srv/business, Dec. 14, 1998.

Stuber, The electronic purse: An overview of recent development and issues, Bank of Canada, Technical Report No. 74, www.bankofcanada.ca, Jan. 1996, printed Feb. 23, 2001, 2 pages.

Understanding the benefits: Smartcity offers a number of important benefits to both the card issuers and their customers, http://www.icl.com/smartcards/benefits.htm, printed Feb. 27, 2001, 2 pages.

Langheinrich et al., Unintrusive Customization Techniques for Web Advertising, Computer Networks, vol. 31, 1999, pp. 1259-1272.

Universal Card free lifetime membership extended 3 months, AT&T Marketing, www.att.com/press/0297/970217.csa.html, Dec. 4, 1990, 2 pages.

Visa Cash—Where can I get it?, www.visa-asia.com/pd/cash/where.html, Feb. 23, 2001.

Visa Cash, www.visa-asia.com/pd/cash/main.html, Feb. 23, 2001.

Visa International And SERMEPA Announce Plans For Cross Border Visa Cash Based On CEPS, www.visa.com/av/news/praaamisc111699.vhtml. Nov. 16, 1999.

Award Card Comparison, JA7922.

Meridicard vs. Debit Cards, JA7917.

Meridian-the leader in card marketing, JA8343.

How Is It Different?, JA8331.

SYSTEM AND METHOD FOR A CARD BENEFIT PROGRAM PROVIDING BENEFITS TO PROGRAM MEMBERS BASED ON PROGRAM PERFORMANCE

CROSS-REFERENCE TO RELATED APPLICATIONS

This application is a continuation application under 35 U.S.C. § 120 of the prior application Ser. No. 10/853,107 filed on May 26, 2004 now U.S. Pat. No. 7,086,586, entitled "System And Method For A Card Payment Program Providing Mutual Benefits To Card Issuers And Cardholders Based On Financial Performance." which was asserts priority to prior provisional application 60/494,559, which was filed Aug. 13, 2003, entitled "Cardholder's Card," both of the aforementioned applications being incorporated herein by reference in their entirety.

FIELD OF THE INVENTION

The present invention relates generally to a system and method for providing a payment instrument in which user-consumers of the payment card product receive returns at various intervals should the program exceed certain pre-disclosed financial performance metrics.

BACKGROUND OF THE INVENTION

It is increasingly common for consumers and small businesses to use payment card products such as charge cards, credit cards, debit cards, pre-paid cards, bankcards and stored value cards rather than using cash or checks. Consumers do this because it is more convenient than using cash or checks, offers greater payment flexibility (such as revolving credit payments at low annual percentage rates, the ability to have a deposit account automatically swept at the end of the month for a full or partial payment, etc.) and because card payment products are available so widely—giving consumers many opportunities to switch to a new payment account and making it easy to open a new account, transfer a balance from an existing account and begin usage immediately.

Marketing to offer such payment account products is increasingly prevalent in our society today. Competition to successfully sell such products is fierce. The card payment industry currently offers more than 4 billion such offers each year through direct mail to U.S. households (source: BAI Global/Mail Monitor, CSFB estimates). Industry experts estimate that payment card marketers utilize more than 55 billion Internet advertising "impressions" each year, more than 2 billion telemarketing telephone calls, and spend millions of dollars to promote card payments through other channels such as in-person sales, bundling with other financial products, and on-site event marketing.

The intense marketing focuses on a variety of messages about why the particular card payment product is more beneficial for users than other card products, such as:

- Low introductory annual percentage rate (for first 1-24 months of product usage)
- Low "go-to" loan rates following any introductory period
- Account information access tools that are available such as via the Internet and telephone
- Card face designs and artwork
- Reward programs linked to the payment cards that reward card usage with travel awards, merchandise, cash back, or other enticements As a result of the vast amount of information contained in the many offers that are received, consumers and small business decision makers are left unsure about which card payment products represent a sound choice for them based on their future spending levels, average sales transaction amount, revolving credit management, servicing options, lifestyle interests, and other personal parameters.

Also, consumers are often wary of the various financial institution practices related to such products, such as policies that dictate when accounts can be "re-priced" with a new annual percentage rate or when terms such as late fees and other penalty charges can be changed. Some consumers feel that the growing revenues reported by publicly-traded, large financial institutions are due to onerous lending and account offering terms aggressively pursued by these institutions, and/or overlay aggressive account management practices such as the imposition of late fees. Some consumers feel large financial institutions manage such programs to create a level of profitability for the institution that is "unfair" or takes more than a perceived reasonable share of consumer and merchant revenues derived from these card payment products.

There is a need for a system and method that assists institutions that offer such card payment products to stand out among the marketing clutter of the industry and allows consumers to evaluate card payment offers and gain assurances that the card payment provider is offering a fair deal. The customers should receive quality card payment products and high-level associated service at a reasonable cost, with the card payment product issuer receiving a reasonable, but not excessive, return.

It is known in the prior art that mutual insurance companies owned by their policyholders can provide funds back to policyholders at specific time periods after the company's operating, marketing, overhead and other costs and expenses are met. Similarly, other insurance companies (e.g., USAA) provide rebates to car insurance policyholders or home insurance policyholders on an annual basis. Also, U.S. Pat. No. 5,025,372 to Burton, et. al. and assigned to Meridian Enterprises, discloses providing rewards to a cardholder based on that cardholder achieving the cardholder's assigned level of performance. However, the prior art does not have card payment account product (e.g. credit card accounts) systems that manage to designated profit levels (or other aggregate financial targets) and provide returns to participating cardholders.

SUMMARY OF THE INVENTION

Accordingly, it is one object of the present invention to overcome one or more of the aforementioned and other limitations of existing systems and methods for the use of card payment instruments.

What is desired is a system and method for providing a card payment or payment account that provides returns to participating cardholders or accountholders when profits to the issuing institution exceed pre-designated levels at pre-designated intervals while the cardholder and financial institution maintain the payment product relationship so that cardholders can share in the financial benefits of operating such a program.

It is another object of the invention to provide such a system and method which allows the issuing institution to promote this benefit to prospective and current cardholders as a way to differentiate the issuing institution's payment card product from the myriad of other card payment account products on the market.

It is another object of the invention to provide such a system and method whereby such a return program encourages cardholders to remain loyal to the issuing institution by maintaining accounts and opening new accounts with the institution.

It is another object of the invention to provide such a system and method to consumers whereby such a program encourages cardholders to remain loyal to the payment account product by encouraging usage of the card payment account for the purchase of goods and services.

It is another object of the invention to provide such a system and method where the payment account issuer and a third-party company that participates in the program by offering the payment card product to its customers share some of the costs associated with the issuance of the payment product and/or the return above a certain level of profitability for the benefit of both institutions.

It is another object of the invention to provide such as system and method to extract profitability data from core, existing operating systems at the financial institution and derive profitability information for the group of participating accounts so that the rebate potential can be tracked and administered.

To achieve these and other objects of the present invention, and in accordance with the purpose of the invention, as embodied and broadly described, an embodiment of the present invention comprises an apparatus and method for a card payment instrument providing that a share of program profits above a pre-designated level is returned to participating consumers at pre-designated intervals such as annually.

According to one embodiment of the invention, messages in various advertising and direct prospective customer communications can highlight that fact that the issuer organization will only retain profits from the program up to a certain level for a specific time period. For example, the program profitability threshold could be placed at a return on outstanding loan dollars of 2.50%. Instead of (or in addition to) a threshold based on % of return on outstanding loans, other profitability metrics can be used such as pre-tax income, pre-tax and pre-marketing cost income, after-tax income, % of return on investment, % of return on equity, total finance charge collected, total fees collected, industry averages of any of the aforementioned, dollars of profit per cardholders dollars of profit per account, and others. The threshold could be established so that the institution would return profits to account holders once the program exceeds the then-average profitability for other card payment programs (e.g. competing programs) in the marketplace. The profitability threshold could be established in other manners. Other aggregate financial metrics besides profitability could readily be employed.

According to one embodiment of the invention, profitability above the threshold would be distributed to cardholder program participants based on an established share methodology. The share methodology would determine how participants remain eligible and how much of the share they receive based on various account parameters (e.g., account usage).

Whatever profitability metric is selected as the basis for the threshold, it can be measured according to various time periods, such as an annual time period, semi-annual time period, a "cumulative since the programs inception" period, or other timeframe. According to one approach, the system of the present invention tracks the profit metric by accessing the financial institution's general accounting and financial reporting systems for all programs to create specialized reporting on profit and loss accounting entries related to these participating payment accounts as a group. Amounts above the threshold may be shared evenly with all participating account holders or cab be based on some other disclosed formula or share methodology (e.g. based on total dollars spent using the card during the period, minimal dollar amounts spent at merchants using the payment product, collected finance charge, annual fees, or some other share metric).

According to some embodiments of the invention, the computed return can be applied as a credit to the card payment account: provided in check format attached to the account statement or some other written communication from the financial institution: provided in check format separately in another form of communication to the accountholder; via automated clearing house (ACH) deposit into a pre-designated deposit or other account held by the accountholder; via electronic funds transfer (EFT) or money order or other form of direct payment.

According to yet another embodiment of the invention, the return is submitted in the form of a favorable change in account terms. For example, return can be provided as a reduction in annual percentage rate charged form the credit payment account; in the form of a reduction in an annual fee or other fees; in the form of enhanced or increased rewards, reward points or other non-financial currency from a frequency or loyalty reward program that is linked to the account, or in the form of spending or investing the funds on behalf of the consumer or other form of compensation.

The invention has many potential benefits and advantages. For example, the invention benefits the card issuing institution that is trying to attract new accountholders and retain existing ones. The prospective customer/existing cardholder can consider this "mutual benefit" when weighing the many options for payment instruments and is able to better understand the financial dynamics of this payment product offering due to the candid communication about profits versus other offerings in the market that do not address such subjects.

Additionally, on an ongoing basis, the financial institution can offer program options to participating cardholders to reduce program administration costs that, should many cardholders participate, will reduce program expense and allow for greater return to cardholders, result in lower borrowing rates or other benefits. Examples of such options include the promotion of low-cost servicing channel access such as Internet or email only (rather than contacting the financial institution for assistance by telephone), setting up auto-pay functionality so that the consumer's core deposit account is electronically accessed by the issuer for account payment or an agreement not to request emergency rush replacement of lost of stolen cards or other account materials.

This new payment account and system (which herein may be referred as the Cardholder's Card™ or a "mutual benefit" product) is advantageous in a number of respects. It is beneficial to card payment issuers because it encourages the creation of new accounts, usage of existing accounts, and maintenance of existing accounts. It is beneficial to consumers and small businesses and other account holders because all participants will benefit if the program is successful (the product is used frequently, participants make payments on time) from a financial standpoint. At the most basic level, the system provides a way for financial institutions to communicate that its customers are being treated fairly in this commercial arrangement. The Cardholder's Card™ can also allow for partnerships between the issuing financial institution and other concerns that will want to offer such a product to their members or customers. This offering can be branded with both the name of the issuing financial institution and its partner.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from that description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

DETAILED DESCRIPTION OF THE INVENTION

As discussed in the Summary of the Invention, the present invention is directed to a system and method for a payment instrument that is associated with a cardholder consumer's account, which that consumer's account is one of many accounts in a portfolio of similar accounts, and whereby returns are issued or applied once pre-designated profitability metrics for the entire portfolio are satisfied.

Figure 1:
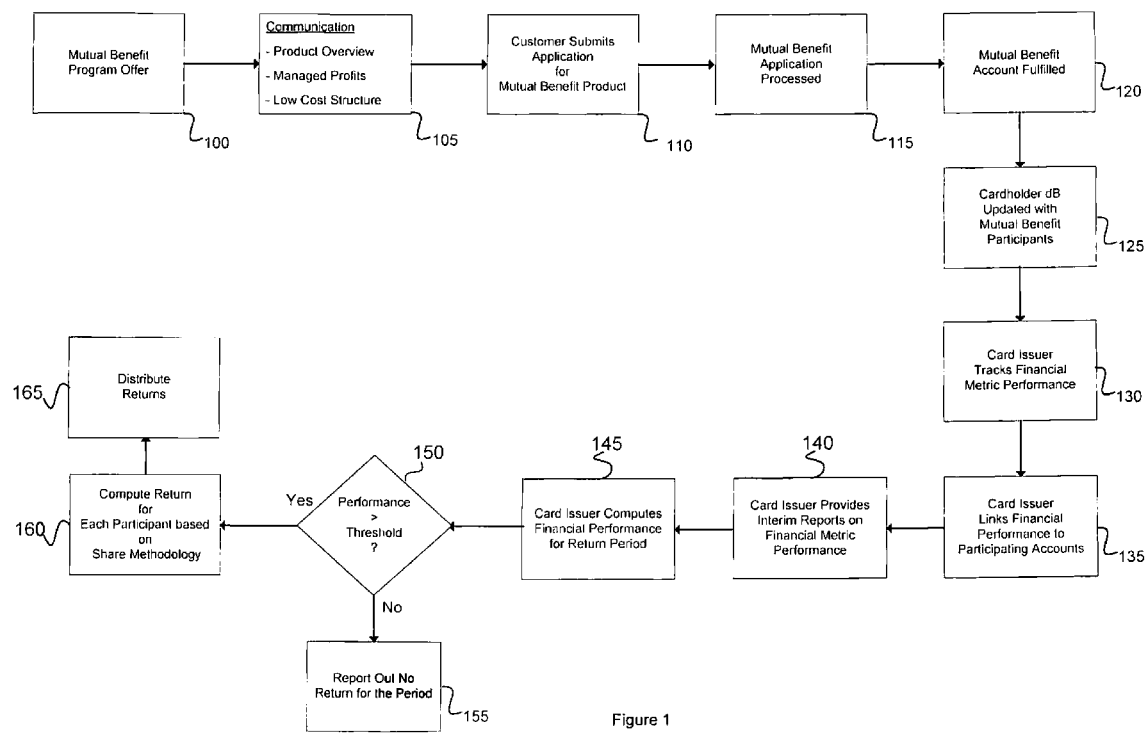
FIG. 1 is a flow chart according to an embodiment of the invention illustrating the process by which a card payment issuer can manage a portfolio of participating card payment accounts and distribute shares to participating cardholders when the portfolio performance exceeds pre-designate criteria.

FIG. 1 is a flow chart according to an embodiment of the invention illustrating the process by which a card payment issuer can process a portfolio of participating card payment accounts and distribute shares to participating cardholders when the portfolio performance exceeds pre-designated financial criteria. The card payment accounts could be for any of a variety of card payment products, such as charge cards, credit cards, debit cards, pre-paid cards, bankcards, and stored value cards. Preferably, the portfolio of participating accounts are credit card accounts.

At 100, a program offer is made to an existing accountholder or a prospective accountholder. The program offer may be made in a variety of manners, such as by direct mail, e-mail, a web page, unsolicited telephone call, an overture during a customer service call, handouts/flyers, print advertising, billboards, and so forth.

At 105, the offer communication preferably provides a product overview, an explanation that the offer relates to a managed profits product, and that the goal is a low cost structure to facilitate the profits goal and returns to participants. Preferably, the program offer includes information describing the "mutual benefit" nature of the card payment account offer that indicates that the card issuer will manage the portfolio to achieve pre-designated financial performance criteria, and if those criteria are met or exceeded, a share of returns will be provided to eligible participating cardholders. The offer may identify the financial performance criteria, as well as the interval(s) over which the performance will be measured. According to one embodiment, the offer may also set forth the so-called "share criteria" regarding the methodology for how returned shares will be determined/allocated. According to one embodiment, the offer may also set forth the manner in which shares are provided, such as (and discussed in more detail below) credits to the participating account, credits to another account, improved account terms, reward points, and so forth.

At 110, the customer (existing accountholder or prospective accountholder) submits an application for the mutual benefit product. The customer may make the application in any suitable manner, such as over the Internet (e.g. using a personal computer, personal digital assistant, or other computing device), over the telephone by submitting data to a human agent, over the telephone by submitting data to a machine agent (e.g., a voice response unit [VRU] or a voice recognition device), through the mail system by mailing in an application, and so forth.

At 115, the application for the mutual benefit product is processed. The application may be processed based on data submitted by the applicant and/or data acquired from a credit bureau. The application may be processed automatically without any human intervention, semi-automatically with limited human involvement, or with substantial human involvement. Preferably, the application processing is carried out by an application processor server component which can access remote credit bureau databases.

At 120, if the application is approved, the mutual benefit account is fulfilled. An account number, expiration date, credit limit (if applicable), account terms, and other account information may be established. At 125, a cardholder database is updated to reflect the new account information. In the case of an applicant who was not an existing accountholder, the database is updated with the typical account information for a new cardholder, as well as information which designates the account as participating in the mutual benefit program. In the case of an existing accountholder applicant, the existing account data may be updated with information which designates the account as a mutual benefit program participant. According to one embodiment of the invention, the card issuer may maintain "regular" accounts for those not participating in the mutual benefit program (e.g. because they did not choose to apply or because they were not given an offer to participate), as well as mutual benefit accounts. The cardholder database may maintain both types of accounts, and can identify the latter through an additional field, flag, or other suitable means for identifying participants.

According to one variation of the invention, mutual benefit program participants may be grouped as a single portfolio. In that scenario, the designated financial performance criteria is based on the performance of that portfolio of participating accounts.

According to another variation of the invention, mutual benefit program participants may be assigned to various sub-portfolios (groups). These assignments may be based on an applicant's selection or request to participate in a particular group. These assignments may be based on the rules imposed by the card issuer for each group. Different groups may have different financial performance criteria and/or different financial performance thresholds.

For example, a card issuer may offer five different groups, each having the same financial criteria based on pre-tax income per account, but each group having a different threshold. The level 1 group may have a threshold of $X/account of pre-tax income, the level 2 group may have a threshold of $X–5/account of pre-tax income; the level 3 group may have a threshold of $X–10/account of pre-tax income, and so forth.

The generalized concept is that accountholders can be segregated into different groups of participating accounts, each having their own criteria and/or threshold for returns. Moreover, at the end of the return interval, accountholders call be moved "up" or "down" to different groups depending on their account-level performance. For example, if an accountholder is a participant in a level 1 group directed to the highest level of performance, but that accountholder was not a high-level performer during the interval, he/she may be removed from the level 1 group and placed in another group or even expelled from the mutual benefit program entirely. The benefit to the card issuer, as well as the program participants, is that this can prevent low performers from undermining the overall performance of a group.

Accountholders may be removed from particular groups based on a variety of disqualifying behaviors. For example, the card issuer may disqualify an accountholder based on negative behaviors such as late payment problems, underspending, periods of inactivity, dramatic changes in credit scoring, and so forth.

Groups may also be based on different categories of financial criteria. For example, one group may be based on return on a % return on outstanding loans criteria, a second based on pre-tax income, a third based on account cost, and so forth. As indicated above, accountholders may be given the option to select which group they wish to participate in. The card issuer, of course, may have guidelines that govern which groups a given accountholder is eligible for.

At 130, the card issuer tracks financial metric performance. The card issuer may have a core financial systems operation that tracks basic financial parameters, such as revenue (various sources, such as interest income, fee income, merchant transaction income, outstanding balance, and so forth), costs (operating costs, marketing costs, overhead, and so forth), and profits. For example, each month, various inputs are collected from the points within the financial institution that track purchases, sales volumes, finance charge collected, account fees, revenue items, expenses, costs and other elements which impact the program. According to the invention, the returns provided to participating cardholders are based on a financial metric. Preferably, the financial metric is based on profitability. Whatever is selected as the financial metric, the core financial systems of the card issuer are employed at 130 to track the overall performance related to this financial metric.

At 135, the card issuer links the financial performance to participating mutual benefit accounts. In other words, based on aggregate financial performance parameters provided by core financial systems, at 135 the subsidiary financial performance parameters associated with the mutual benefit accounts are derived. This may be accomplish in various fashions. For example, revenue may be computed by reducing the aggregate revenue figures to remove nonparticipating accounts. Costs may be computed in the same manner, although certain cost figures (e.g. overhead) which are not amenable to allocation on an account-specific basis, may be allocated pro rata or another appropriate fashion. Based on 135, the card issuer generates a participating account portfolio performance measure for the selected financial metric. A variety of financial metrics are discussed below, but just for example, if the metric is % return on loans, the output of 135 might be 3.2% annualized.

If the mutual benefit program is implemented as a series of groups with different financial performance metrics, 130 and 135 are implemented to track the performance for each of these different metrics.

At 140, the card issuer may provide interim reports to the participating cardholders regarding the financial metric performance. Just by way of example, if the metric is % return on outstanding loans, the threshold is 2.5%, and the interim performance is 3.2% annualized, the card issuer may issue communications that the portfolio is on track to exceed the goal. The card issuer may issue these communications in statement messages, statement inserts, separate mailings, e-mails, website content, phone calls, on-hold messages, customer service representative (CSR) updates while the customer is on the phone, cardholder newsletters, or other suitable fashions. The interim reports are beneficial because they provide preliminary feedback to participants on the success of the program. If performance is behind the target, for example, due to higher costs, the communications may encourage the participants to modify their account behavior to improve performance (e.g. by reducing costs).

At 145, the card issuer computes the financial performance for the return period. The period could be any suitable pre-designated interval, such as annually, semi-annually, bi-annually, quarterly, and so forth. The computed financial performance reflects the actual performance of the portfolio for that period and reflects whether the target financial performance was achieved.

At 150, the card issuer compares the actual performance against the goal or threshold. If the goal was not achieved/exceeded, at 155 the card issuer reports out that there will be no share returns for the period. If the goal was achieved/exceeded, at 160 the card issuer computes a return for each participant based on the share methodology. The share methodology reflects how the return is to be allocated among participants. The share methodology can be very simple, such as each participant getting a fixed return amount (e.g., $25.00, 1000 reward points, a reduction/elimination of annual fees, a reduction in interest rate, an even share of the excess, or other return).

The share methodology can be more complex so that different participants get different returns. For example, a net return value may be computed by the card issuer (e.g. 5,000,000 value). That net return value may then be allocated across the participants based on (1) account behavior parameters and/or (2) qualifying criteria. Account behavior parameters (discussed further for FIG. 6) may relate to the volume of account activity (e.g., total charge volume and/or total interest paid). Thus, participants with higher volume accounts may receive proportionately higher share returns. Qualifying criteria related to minimum account behaviors to qualify for a return. For example, the card issuer may provide that only participants with a minimum of $25,000 net volume for the period qualify for a return.

Moreover, as discussed above, the invention is amenable to assigning cardholders to various different groups (each considered to be a portfolio), each group having its own financial performance metric and/or financial performance threshold. Thus, the aforementioned steps for tracking performance and determining whether a return is available due to satisfaction of the financial metric threshold may be carried out for each of the various groups.

Based on the share methodology, the returns are distributed at 165. The returns may be distributed in any suitable fashion, such as by credits to the participating account, credits to different accounts, a favorable change in account terms, reward points, paper check, and so forth. The cardholder may be given the option of how the return is to be provided, such that some accountholders may wish to receive an account credit, while others receive a credit to a different account, while others get a reduction in interest rate, and so forth.

The consumer's selection of how the return is to be provided may be made available when the consumer first applies to participate the in the mutual benefit program. For example, the option could be given as a radio button to select or box to check when applying over the Internet. Alternatively, the consumer's selection may be provided at the end of the computing interval. For example, the financial institution could give each consumer the option once it is determined that a return is available. This approach would allow consumers to revise how the benefit is to be provided from interval to interval.

As previously described, based on the individual performance for the interval, accountholders may be removed from their existing groups or removed from the program entirely. For example, poor individual performers may be moved to lower performance goal groups. Or they may be removed from the program entirely. On the other hand, excellent performers may be moved into higher performance goal groups.

Figure 2:
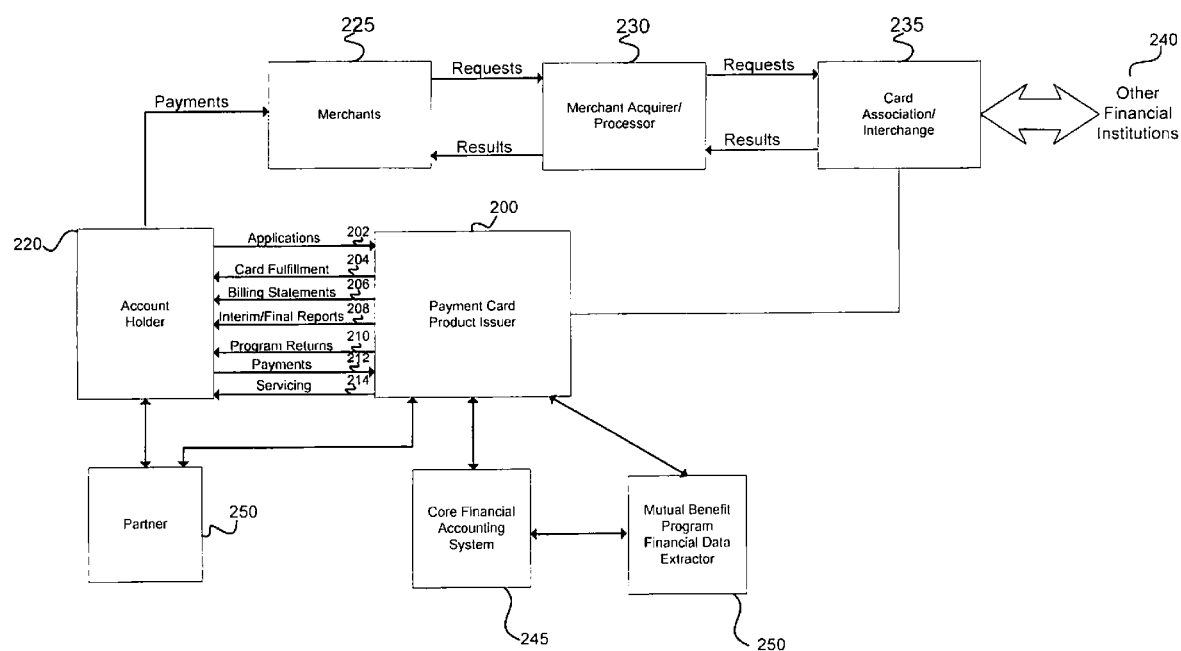
FIG. 2 is a flow chart according to an embodiment of the invention illustrating the relationship between the account holder, the issuing financial institution, merchants that accept the card payment instruments for payment, and a partner.

FIG. 2 is a flow chart according to an embodiment of the invention illustrating the relationship between the account holder, the issuing financial institution, merchants that accept the card payment instruments for payment, and a partner. Payment card product issuer 200 issues the mutual benefit card payment accounts of the present invention. Preferably, issuer 200 is a financial institution. Many of issuer 200's processes are internal operations, although some operations may be carried out by third parties as appropriate. For example, credit bureau data may be maintained by a third party credit bureau. Account building/card fulfillment and transaction processing operations may be carried out by a third party account fulfillment/card processor. Generally, card issuer 200 interfaces with each account holder 220 for various operations, such as for receiving applications 202, card fulfillment 204, billing statements 206, payments 212, and account servicing 214. For participants in the mutual benefit card payment account of the invention, the issuer 200 issues interim and final reports 208 regarding financial performance of the portfolio, as well as share returns 210.

As described above, issuer 200 will access a core financial accounting system 245 to derive the performance of the portfolio. Both issuer 200 and core financial system 245 may interface with a data extractor module 250 which computes, extracts, or otherwise derives the performance of the portfolio of accounts from the aggregate account data. Core financial accounting system 245 may include one or more networked computers which can access financial data inputs in order to track revenue, costs, profits, and/or other financial performance parameters. The data extractor module 250 can be a process implemented within the core financial accounting system 245, or it may be implemented as a separate process on a stand-alone computer.

Issuer 200 may interface with a card association/interchange 235 (e.g., VISA™, MasterCard™; and/or American Express™ and Discover™ who are now offering access to their platforms by other institutions) in order to process transactions for the card payment accounts. Issuer 200 may also interface with a partner 250, which may be a co-brand entity, partner, or other financial institution, which sponsors the card payment instruments jointly with the card issuer. Partner 250 may market the product to its existing customers, including potentially marketing the product with the name and mark of partner 250. According to one embodiment, the partner and the card issuer share the costs of mutual benefit program. For example, both the partner and card issuer can contribute to the share returns provided to the participants. According to another embodiment, the share returns are issued as value redeemable with the partner, such as points (e.g. frequent flyer miles, rental miles, etc.) or other value that can be used against the partner's goods or services.

Accountholder 220 interfaces with merchants 225 to make payments for goods or services using the card payment instrument. The payments can be made as point-of-sale (POS) transactions, transactions over the Internet, the phone, and so forth. Merchants 225 make transaction requests which are provided to a merchant acquirer/processor 230, which may forward them through an card association/interchange 235, which in turn may forward them on to the issuer 200 for approval/denial. Results from merchant transaction requests are returned back to the merchants 225 so that sales can be completed. The card association/interchange 235, of course, may interface with other financial institutions 240.

Figure 3:
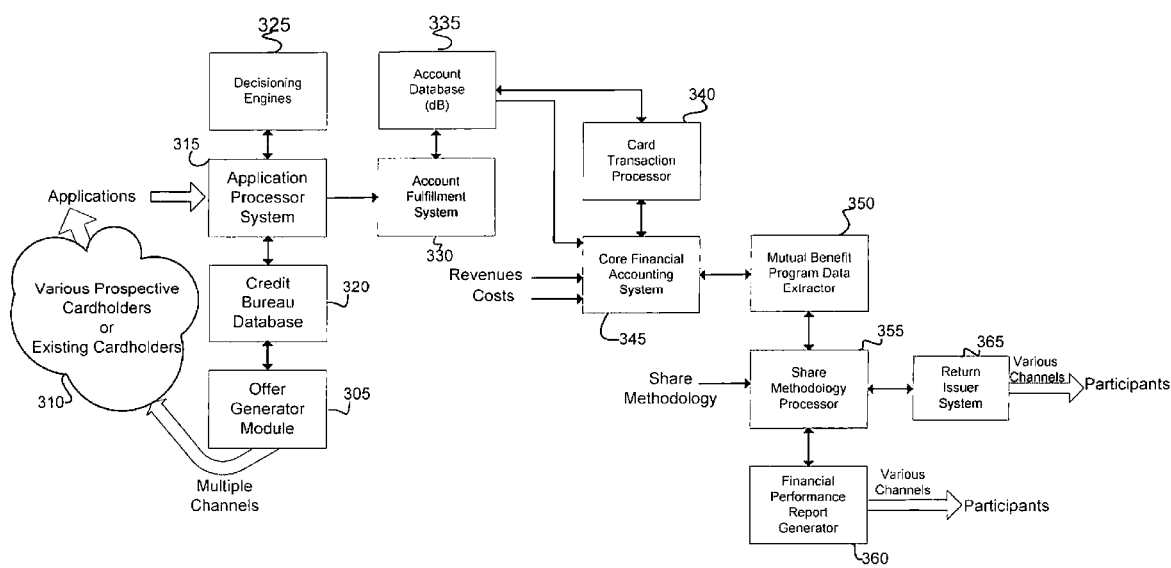
FIG. 3 is a diagram illustrating a system according to an embodiment of the invention for a card payment issuer to manage a portfolio of participating card payment accounts and distribute shares to participating cardholders when the portfolio performance exceeds pre-designate criteria.

FIG. 3 is a diagram illustrating a system according to an embodiment of the invention for a card payment issuer to manage a portfolio of participating card payment accounts and distribute shares to participating cardholders when the portfolio performance exceeds pre-designate criteria for the selected financial performance metric. At 305, an offer generator module 305 of the card issuer issues offers for the mutual benefit account over multiple channels to existing cardholders or prospective cardholders 310. The multiple channels may include offers in statements for existing cardholders, direct mailings, Internet web page offers, e-mail offers, phone solicitations, and so forth. Applications are submitted to application processor system 315, which may access one or more credit bureau databases 320 and one or more decisioning engines 325 to arrive at a decision. If the application is approved, an account fulfillment system 330 establishes the new mutual benefit account or updates the information for an existing account to reflect the change in status. The fulfillment is reflected in entries made or changes made to account database 335.

Card transaction processor 340 processes transactions against the accounts, which may include charge transactions, payments, and so forth. Processor 340 could be an operation that is internal to the card issuer or it could be an external operation carried out by an agent. The account database 335 is updated based on the transactions.

Core financial accounting system 345 monitors transactions, fees (both annual-type fees and merchant transaction fees), payments, costs, and the like in order to track financial performance for the issuer. Mutual benefit program data extractor 350 interfaces with (or can be implemented within as a sub-process) core financial accounting system 345 in order to compute, extract, or otherwise derive the performance of the portfolio of mutual benefit accounts according to the pre-designated financial metric. Core financial system 345 and/or data extractor 350 may be implemented as one or more computers in a networked system.

Share methodology processor 355 accepts the portfolio performance data and applies a pre-designated share methodology in order to allocate share returns when measured financial performance satisfies or exceeds the threshold. When the threshold is satisfied or exceeded, return issuer system 365 issues the share returns to participating accountholders according to the share methodology. As described previously, the share methodology may set minimum account behavior benchmarks to qualify for a return, and/or may allocate the aggregate determined return based on account behavior parameters. The returns can be issued to participants over various channels as described previously, such as via electronic credits to the accounts, electronic transfers to other accounts, electronic awards of points, checks issued with account statements or by separate mailings, and so forth.

Financial performance report generator 360 may issue interim and final reports over various channels as previously described.

Figure 4:
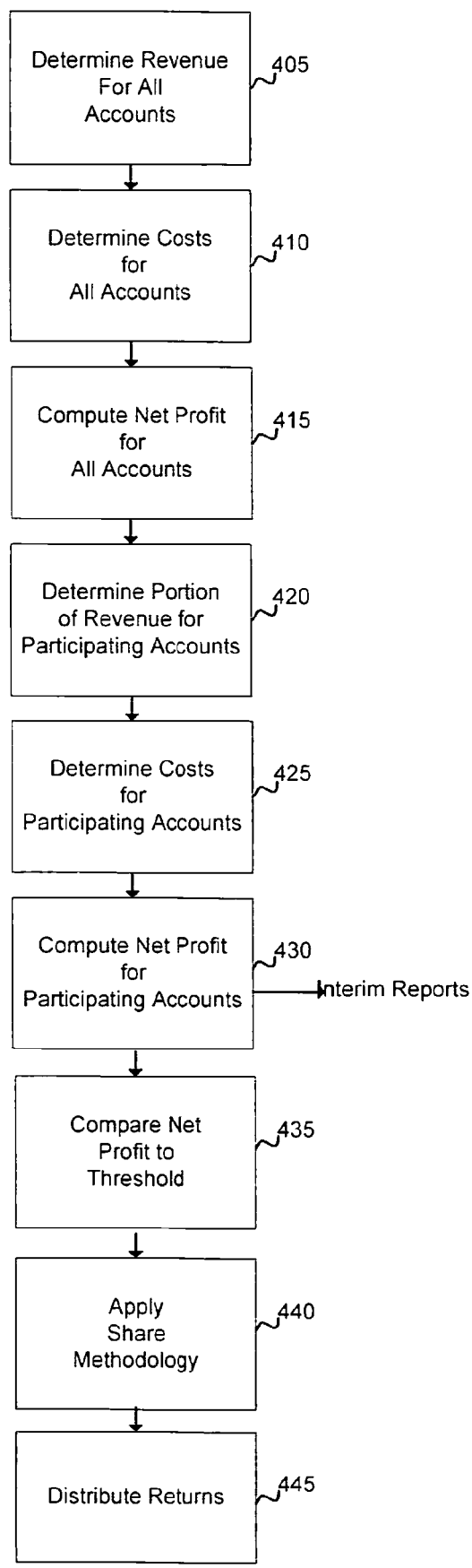
FIG. 4 is a flow chart of a method according to an embodiment of the invention for tracking financial performance of a portfolio of participating accountholders in order to determine shares when performance exceeds a criteria.

FIG. 4 is a flow chart of a method according to an embodiment of the invention for tracking financial performance of a portfolio of participating accountholders in order to determine shares when performance exceeds a threshold. FIG. 4 illustrates just one approach for determining the performance of participating accounts from the aggregate financial performance for the card issuer. Other approaches could easily be taken without departing the spirit and scope of the present invention. At 405, the revenue for all accounts is determined. At 410 the costs for all accounts is determined. At 415, a net profit for all accounts is determined. At 420, the portion of revenue associated with participating accounts is determined. At 425, the portion of costs for participating accounts is determined. At 430, a net profit for participating accounts is determined. Interim reports may be issued. At 435, the determined net profit for the participating accounts is compared to a threshold.

As described previously, the threshold can be established in a variety of fashions. For example, it may be a fixed threshold, such as X % profit, $XX total profit. $XX profit/account, $XX profit/cardholder, and so forth. Or it may be a relative threshold, such as a ratio to (or delta over) some performance benchmark, such as the performance of the issuer's entire portfolio of card accounts, the performance of the issuer's non-participating portfolio, the performance of other issuers in the industry, and so forth.

At 440, the share methodology is applied such that an aggregate return is allocated across the participating accountholders. The aggregate return may be determined based on the level of performance above the threshold. For example, the aggregate return may be the total profit above the threshold. Alternatively, the aggregate return can be determined in other fashions. For example, it could be a fixed amount, such as $5,000,000 to be distributed regardless of how much the threshold is exceeded. The aggregate return could be computed based on an incentive formula. For example, the incentive formula could provide that some portion of the excess is distributed. For example, the formula could provide that 50% of all profits above a profits threshold are distributed. Other approaches for computing the aggregate return could be employed without departing from the spirit and scope of the present invention.

Figure 5:
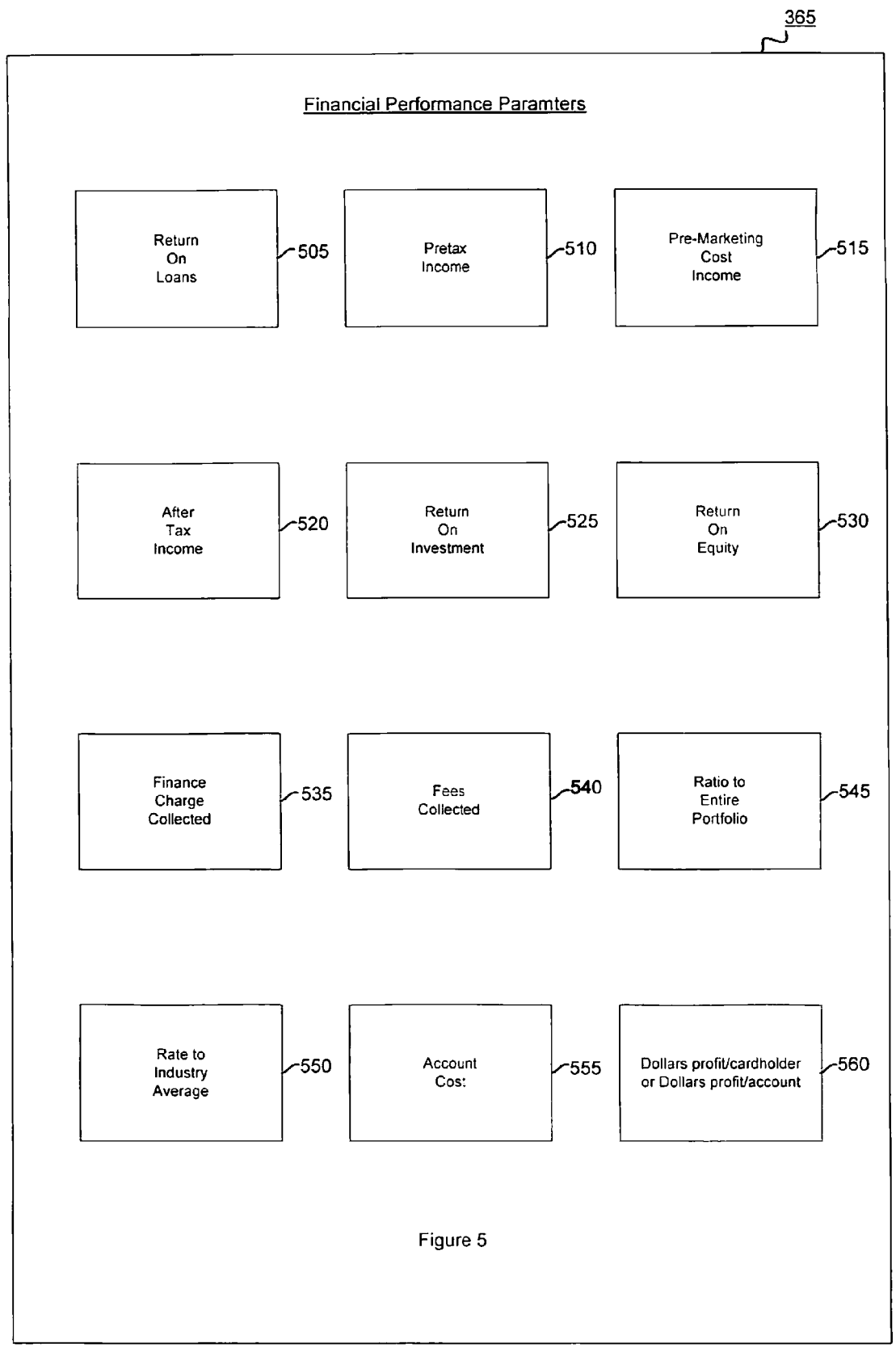
FIG. 5 is a block diagram of the various financial performance criteria which cam be employed in evaluating portfolio performance according to an embodiment of the invention.

At 445, the returns are issued based on the share methodology. FIG. 5 is a block diagram of the various financial performance criteria which can be employed in evaluating portfolio performance according to an embodiment of the invention. FIG. 5 is merely illustrative, and a variety of other financial performance criteria could easily be employed without departing from the spirit and scope of the invention. Exemplary criteria include return on loans (e.g., % return on outstanding loans) 505, pre-tax income 510, pre-marketing cost income 515, after-tax income 520, return on investment 525, return on equity 530, finance charge collected 535, fees collected 540, ratio to entire portfolio 545, ratio to industry average 550, account cost 555, dollars profit per cardholder or dollars profit per account 560. Other financial performance metrics could be employed. It is understood that a plurality of the criteria in FIG. 5 can be combined so that multiple criteria are employed.

Figure 6:
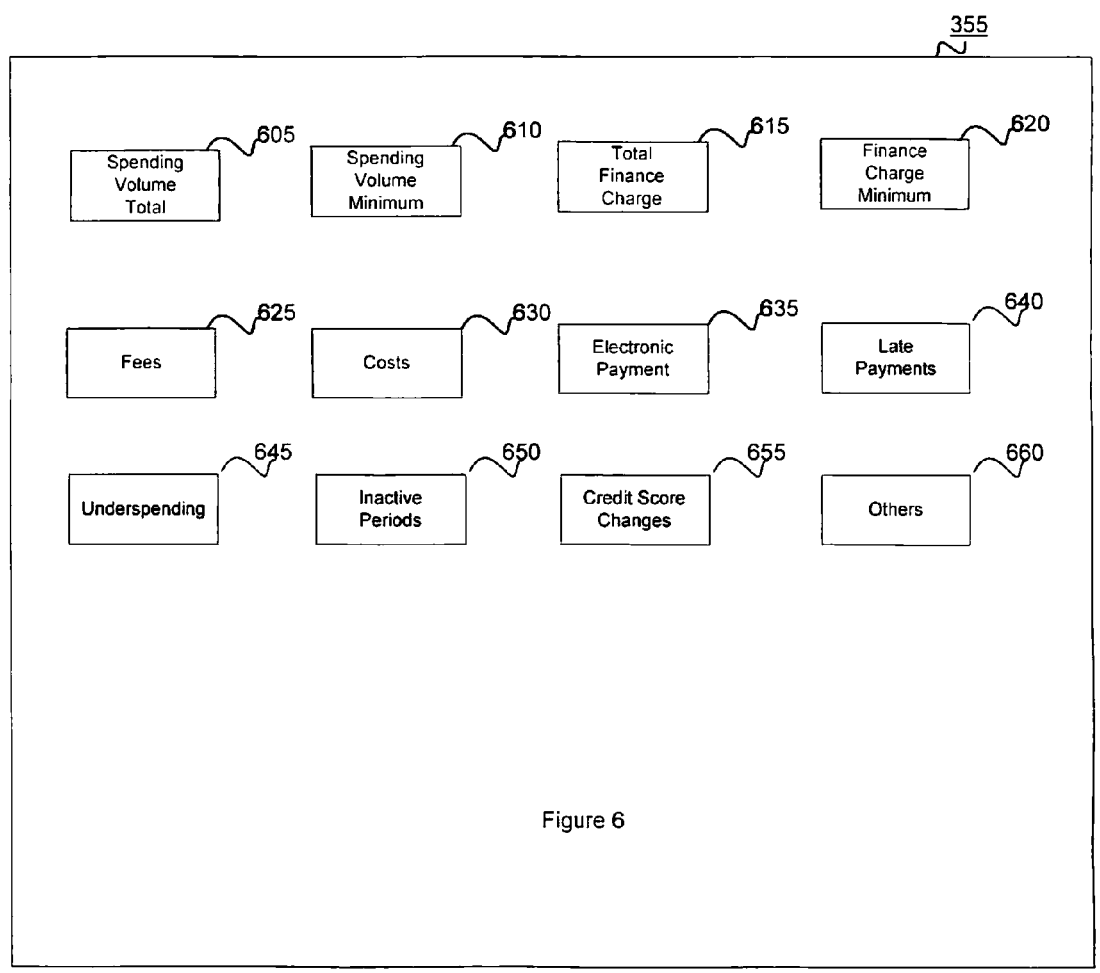
FIG. 6 is a block diagram according to an embodiment of the invention of the various cardholder parameters which can be considered in determining the shares issued to participating accountholders.

FIG. 6 is a block diagram according to an embodiment of the invention of the various cardholder parameters which can be considered in determining the shares issued to participating accountholders. FIG. 6 relates to the share methodology discussed above. The share methodology may include cardholder behavior parameters that determine how large the return share is for that cardholder. The share methodology may also include minimum qualifying parameters that must be satisfied to qualify for a share in the first instance. The share methodology may also include disqualifying parameters that may result in the cardholder being removed from the portfolio (or moved to a different portfolio). The cardholder behavior parameters considered may include spending volume 605, spending volume minimum (as a qualifying parameter) 610, total finance charge 615, finance charge minimum (as a qualifying parameter) 620, fees 625 (e.g., merchant fees paid on the account and/or annual fees paid), costs 630 (costs imposed on the card issuer by the account), and electronic payment 635 (as a qualifying parameter).

Electronic payment 635 may be a qualifying parameter tied to whether the cardholder has authorized the account to be automatically paid each month using a linked checking account, for example. Additionally, on an ongoing basis, the financial institution can offer program options to participating cardholders to reduce program administration costs that, so that if many cardholders participate will reduce program expense and allow for greater return to cardholders, result in lower borrowing rates or other benefits. Examples of such options include the promotion of low-cost servicing channel access such as Internet or email only (rather than contacting the financial institution for assistance by telephone), setting up auto-pay functionality so that the consumer's core deposit account is electronically accessed by the issuer for account payment, or an agreement not to request emergency rush replacement of lost of stolen cards or other account materials. Such "low cost options" can be considered by the share methodology either as a qualifying parameter, or can be used to enhance the return provided to accountholders who select those options.

Elements 640-655 refer so so-called disqualifying parameters that can result in the accountholder being removed from his/her group and placed in another group, or removed from the mutual benefit program altogether. Late payments 640 may result in disqualification if the accountholder has been late a specified number of times. Underspending 645 may result in disqualification if the accountholders total spending on the card account has been unacceptably low. Inactive periods 650 may result in disqualification if there is one or more long periods of time without any account activity. Credit scoring changes 655 may result in disqualification if the accountholder's credit score significantly drops. Other parameters 660 could be considered for disqualification.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

Those of skill in the art should appreciate that the allocation of the elements in the various figures is exemplary and functional, the purpose here being to explain the present invention most clearly. The functions performed by said elements could be allocated differently, such that the elements could be combined or further divided depending on the requirements of specific implementation into hardware and or software. Additionally, the elements of the system need not to be co-located, but could reside at geographically distinct locations ad could interface using communications technologies well known in the art, such as direct-dial connections, hardware link, the Internet or various Internet protocol standards, satellite, microwave, cellular networks and so on.

What is claimed is:

1. A computer-implemented method, comprising:
    establishing in a computer database a card payment account for an accountholder which provides returns based on a performance of a card issuer according to one or more performance metrics;
    wherein said returns are based on a performance meeting or exceeding the one or more performance metrics during a pre-designated interval;
    tracking performance of the account during the interval;
    computing the performance of the account for the interval;
    comparing the performance of the account during the interval to the one or more performance metrics and computing a return if the one or more performance metrics are met or exceeded.

2. The computer-implemented method of claim 1 wherein said performance metrics comprise financial performance metrics.

3. The computer-implemented method of claim 2, further comprising the step of computing the performance of an individual cardholder and disqualifying the cardholder from the cardholder's portfolio based on one or more disqualifying behavioral parameters.

4. The computer-implemented method of claim 1, further comprising the step of establishing in said computer database a plurality of portfolios of cardholders, the plurality of portfolios having one or more different performance metrics.

5. The computer-implemented method of claim 1, wherein said card payment account comprises a credit card account, a stored value card account, a debit card account, a multi-featured credit-on-debit account, a charge account, or a pre-paid account.

6. The computer-implemented method of claim 1, wherein a return is provided as a credit to the account of a participating accountholder.

7. The computer-implemented method of claim 1, wherein a return is provided as a deposit to a separate account of a participating accountholder.

8. The computer-implemented method of claim 1, wherein a return is provided by issuing a paper check to a participating accountholder.

9. The computer-implemented method of claim 1, wherein a return is provided by issuing revised account terms more favorable to the accountholder.

10. The computer-implemented method of claim 1, wherein a return is provided as reward points.

11. The computer-implemented method of claim 1, wherein a return is provided as frequent flyer miles.

12. The computer-implemented method of claim 1, wherein a return is provided as an investment on behalf of a participating accountholder.

13. The computer-implemented method of claim 1, further comprising:
    issuing one or more interim reports regarding the performance of the account during the interval to the participating accountholders.

14. The computer-implemented method of claim 1, further comprising:
    issuing card payment account statements to participating cardholders that include information of account activity and information of portfolio performance.

15. The computer-implemented method of claim 1, wherein the card payment account statements further include information of a projected net return or a projected share return.

16. A system for monitoring card account portfolio performance and issuing performance-based returns, comprising:
    an account database storing data of a portfolio of card accounts which are eligible for a return based on the portfolio meeting one or more pre-designated performance metrics for the card issuer over a pre-designated interval;
    a card transaction processor for processing transactions against said card accounts;
    a system for maintaining performance metrics for the card issuer;
    a data extractor module for deriving performance data for one or more participating recipients and comparing derived performance data to said pre-designated performance metrics;
    a share allocation module for allocating a return based on results of the comparison across one or more participating recipients based on a share formula; and
    a return issuer system for providing allocated shares of the return to the one or more participating recipients.

17. The system of claim 16, wherein the said participating recipients comprise card account holders.

18. The system of claim 17, wherein the share allocation module computes the performance of an individual cardholder and disqualifies the cardholder from the cardholder's portfolio based on a disqualifying parameter.

19. The system of claim 17, wherein the account database includes information of accountholders participating in the program making them eligible for a return as well as accountholders not participating in said program.

20. The system of claim 17, wherein said card payment accounts are credit card accounts.

21. The system of claim 16, wherein the said participating recipients comprise a partner which sponsors the card payment instruments jointly with the card issuer.

22. The system of claim 16, wherein the said participating recipients comprise card issuers.

23. The system of claim 16, wherein the said participating recipients comprise card sponsors.

24. The system of claim 16, wherein the said participating recipients comprise card co-brand entities.

25. The system of claim 16, wherein said account database stores data of a plurality of portfolios of card payment accounts, the plurality of portfolios having different financial metrics or different financial thresholds.

26. A system for monitoring card account portfolio performance and issuing performance-based returns, comprising:
   an account database storing data of one or more portfolios of card accounts which are each independently eligible for a return based on each portfolio meeting one or more pre-designated performance metrics for a card issuer over a pre-designated interval;
   a card transaction processor for processing transactions against the card accounts;
   a system for maintaining performance metrics for the card issuer;
   a data extractor module for deriving performance data for one or more participating recipients and comparing derived performance data to the pre-designated performance metrics;
   a report module issuing card payment account statements to participating recipients that include information of account activity, information of portfolio performance and information of a projected net return or a projected share return;
   a share allocation module for allocating a return based on results of the comparison across participating recipients based on a share formula; and
   a return issuer system for providing allocated shares of the return to the participating recipients.

* * * * *